(12) United States Patent
Hasegawa et al.

(10) Patent No.: US 6,508,123 B2
(45) Date of Patent: Jan. 21, 2003

(54) ANGULAR VELOCITY SENSOR

(75) Inventors: Tomoyasu Hasegawa, Sagamihara (JP); Kaneo Yaji, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 31 days.

(21) Appl. No.: 09/764,606

(22) Filed: Jan. 17, 2001

(65) Prior Publication Data

US 2001/0008088 A1 Jul. 19, 2001

(30) Foreign Application Priority Data

Jan. 19, 2000 (JP) .......................... 2000-009836

(51) Int. Cl.[7] .......................... G01C 19/00; H01L 41/08
(52) U.S. Cl. ...................... 73/504.12; 310/316
(58) Field of Search ..................... 73/504.12, 504.13, 73/504.14, 504.15, 504.16, 504.04; 310/315, 316, 317, 319, 321, 329

(56) References Cited

U.S. PATENT DOCUMENTS 5,473,288 A * 12/1995 Kumada .................. 73/504.12
5,604,310 A * 2/1997 Nakamura ................ 73/504.12
5,635,787 A * 6/1997 Mori et al. ............... 73/504.12
5,648,608 A * 7/1997 Nakamura ................ 73/504.12

FOREIGN PATENT DOCUMENTS

| DE | 19712021 A1 | 3/1998 |
| DE | 69413154 T2 | 5/1999 |
| DE | 69510850 T2 | 4/2000 |
| DE | 69513451 T2 | 5/2000 |
| JP | 08050022 A | 2/1996 |
| JP | 09229688 A | 9/1997 |

* cited by examiner

Primary Examiner—Helen Kwok
(74) Attorney, Agent, or Firm—Keating & Bennett, LLP (57) ABSTRACT

An angular velocity sensor includes: a vibrator; a support for supporting the vibrator so as to be capable of vibrating; a driver for driving the vibrator by an electrostatic force; a detector for detecting a displacement of the vibrator based on a Coriolis force applied to the vibrator as a variation of electrostatic capacitance; and a capacitance-voltage converting circuit for converting the variation of the electrostatic capacitance detected by the detector into a voltage variation, the capacitance-voltage converting circuit being made as a source-follower circuit connected to a high-resistance gate resistor between a gate and a source using a JFET, and wherein the gate of the JFET is connected to a bias power supply via a bias resistor.

10 Claims, 6 Drawing Sheets

ANGULAR VELOCITY SENSOR

BACKGROUND OF THE INVENTION

1. Field of the Invention

The present invention relates to an angular velocity sensor, and more specifically, it relates to an angular velocity sensor using a vibration-type angular velocity detecting element.

2. Description of the Related Art

Recently, angular velocity sensors have been used in cameras, car navigation systems, overturn detection of a car, posture control sensors and the like. In order to prevent blurring due to hand shaking when taking a picture with a camera, in order to indicate the car route in the car navigation system, and in order to improve safety when traveling by car, an angular velocity signal of the angular velocity sensor is used.

Figure 6:
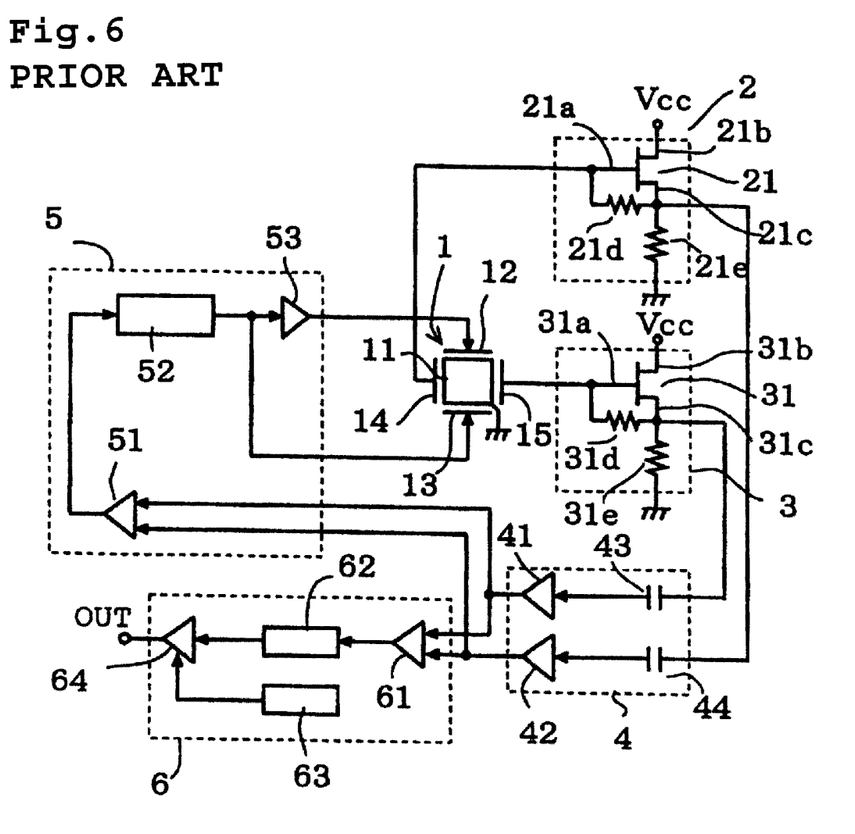
FIG. 6 is a circuit block diagram of a conventional angular velocity sensor.

FIG. 6 shows a circuit block diagram of a conventional angular velocity sensor. Numeral 1 is an angular velocity detecting element which is provided with a vibrator 11, a driving electrode part 12, a driving electrode part 13, a detecting electrode part 14 and a detecting electrode part 15. The vibrator 11 has a ground electric potential and the driving electrode part 12 and the driving electrode part 13 vibrate the vibrator 11 electrostatically. Also, the detecting electrode part 14 and the detecting electrode part 15 detect a displacement of the vibrator 11 electrostatically. Numeral 2 and numeral 3 are capacitance-voltage converting circuits and the capacitance-voltage converting circuit 2 is provided with a junction field effect transistor (hereafter, called a JFET) 21 and the capacitance-voltage converting circuit 2 is provided with a JFET 31. A gate 21a of the JFET 21 is connected to the detecting electrode part 14 of the angular velocity detecting element 1 and is connected to a source 21c of the JFET 21 via a gate resistor 21d. Also, a gate 31a of the JFET 31 is connected to the detecting electrode part 15 and is connected to a source 31c of the JFET 31 via a gate resistor 31d. A drain 21b of the JFET 21 and a drain 31b of the JFET 31 are each connected to a direct current source Vcc, and the source 21c is connected to a ground via a source resistor 21e and the source 31c is connected the ground via a source resistor 31e. Also, the source 21c is an output terminal of the capacitance-voltage converting circuit 2 and the source 31c is an output terminal of the capacitance-voltage converting circuit 3 and the voltage across the source resistor 21e is an output signal and the voltage across the source resistor 31e is an output signal.

Numeral 4 is an alternating-current amplifying circuit, and is provided with two amplifiers 41 and 42 and direct-current-blocking-capacitors 43 and 44. Outputs of the capacitance-voltage converting circuits 2 and 3 are respectively connected to inputs of the amplifiers 41 and 42 via the direct-current-blocking-capacitors 43 and 44, and the output signals are amplified. Numeral 5 is a driving control circuit which is provided with a non-inverting amplifier circuit 51, a driving signal forming circuit 52 and an inverting amplifier circuit 53. Outputs of the amplifiers 41 and 42 are connected to inputs of the non-inverting amplifier circuit 51 and the output of the non-inverting amplifier circuit 51 is connected to the input of the driving signal forming circuit 52. The output of the driving signal forming circuit 52 is connected to the driving electrode part 13 of the angular velocity detecting element 1 and is connected to the driving electrode part 12 via the inverting amplifier circuit 53. N numeral 6 is an output circuit which is provided with a differential amplifier 61, a synchronous detecting circuit 62, an offset adjusting circuit 63 and a sensitivity adjusting amplifier 64. The inputs of the differential amplifier 61 are connected to outputs of the amplifiers 41 and 42 and the output of the differential amplifier 61 is connected to the input of the sensitivity adjusting amplifier 64 via the synchronous detecting circuit 62. The output of the offset adjusting circuit 63 is connected to the input of the sensitivity adjusting amplifier 64.

The operation of the above-described circuit block will be explained. When a driving signal having a constant frequency and a constant amplitude is applied to the driving electrode parts 12 and 13 of the angular detecting element 1 from the driving control circuit 5, the vibrator 11 is driven and vibrates at a specific mechanical vibration frequency in a predetermined direction. The driving control circuit 5 usually applies a driving signal of a frequency approximately the same as the mechanical resonance frequency of the vibrator 11, for example, 10 kHz, to the driving electrode parts 12 and 13. When an angular velocity is applied to the vibrator 11 of the angular velocity detecting element 1, the vibrator 11 is displaced in a direction orthogonal to the vibrating direction of the vibrator 11, that is, in a direction in which a Coriolis force occurs, and variations in the electrostatic capacitance appear at the detecting electrode parts 14 and 15. The vibrator 11 vibrates with a vibration vector obtained by adding the Coriolis force and the driving force.

Two signals with phases differing from each other by 180 degrees are output from the detecting electrode parts 14 and 15 of the angular velocity detecting element 1 and are supplied to the capacitance-voltage converting circuits 2 and 3. The frequency of the output signal is the vibration frequency of the vibrator 11, and the phase of the output signal is delayed by 90 degrees with respect to the phase of the driving signal. The capacitance-voltage converting circuits 2 and 3 respectively convert capacitance variations at the detecting electrode parts 14 and 15 of the angular velocity detecting element 1 into voltages. The direct current component of the output signals from the capacitance-voltage converting circuits 2 and 3 are blocked by the direct-current-blocking capacitors 43 and 44 and the output signals are amplified by the amplifiers 41 and 42. Two outputs from the amplifiers 41 and 42 are input into the non-inverting amplifier circuit 51 and the differential amplifier 61. The non-inverting amplifier circuit 51 adds the outputs of the two amplifiers 41 and 42 and extracts a vibration amplitude signal component for the driving signal driving the angular velocity detecting element. Also, the differential amplifier 61 obtains the difference between the two output signals of the amplifiers 41 and 42 and extracts an angular velocity signal component due to the Coriolis force.

The driving signal forming circuit 52, which is provided with a chopping-wave forming circuit and an amplitude adjusting circuit, receives as input a signal having a vibration amplitude signal component from the non-inverting amplifier circuit 51 to form a chopping-wave signal and outputs a driving signal maintaining the vibration of the angular velocity detecting element 1. The driving signal is supplied to the driving electrode part 13 of the angular velocity detecting element 1 and is supplied to the driving electrode part 12 via the inverting-amplifier circuit 53 after phase-inversion by 180 degrees. With this operation, the vibrator 11 of the angular velocity detecting element 1 is energized by the driving signals, the phases of which differ by 180 degrees from each other, and vibrates at a constant amplitude. The vibration amplitude signal component is fed back from the non-inverting circuit 51 to the driving signal forming circuit 52, and thereby a self-excitation oscillating system for driving the angular velocity detecting element 1 is formed.

The angular velocity signal component obtained from the differential amplifier 61 is supplied to the synchronous detecting circuit 62. The synchronous detecting circuit 62 executes synchronous detection for the output signal of the differential amplifier 61 which sets the driving signal of the driving signal forming circuit 52 as a reference signal, and only an angular velocity signal is output. The offset adjusting circuit 63 outputs an adjusting signal for adjusting the offset voltage of the angular velocity signal passing through the synchronous detecting circuit 62 to the sensitivity adjusting amplifier 64. That is, the sensitivity adjusting amplifier 64 outputs an angular velocity signal of which the offset is adjusted.

An example of the angular velocity detecting element 1 shown in FIG. 6 is explained with reference to FIG. 7. Numeral 7 is a quadrangular support frame which is provided with support parts 71 and 72 inside and opposite to each other. Numeral 16 is a quadrangular outer-frame vibrating part which is a part of the vibrator 11, and is supported by both ends of outer beams 16a and 16b. The outer beams 16a and 16b are provided at ends of the support parts 71 and 72 and extend in a direction orthogonal to the support parts 71 and 72. On the inside of the quadrangular outer-frame vibrating part 16, and positioned in directions orthogonal to a direction connecting the support parts 71 and 72, projecting parts 16c and 16d are provided so as to face the inside and to be opposite each other. Numeral 17 is a quadrangular inner-frame vibrating part which is a part of the vibrator 11, and is supported by both ends of inner beams 17a and 17b. The inner beams 17a and 17b are provided at ends of the projecting parts 16c and 16d and extend in a direction orthogonal to the longitudinal directions of the outer beams 16a and 16b. On the inside of the inner-frame vibrating part 17, a mass part 17c extends in a direction connecting the support part 71 and the support part 72 of the support frame 7.

Numerals 12 and 13 are the driving electrode parts, and are provided at both outer edges of the outer beams 16a and 16b in the extending directions. The driving electrode parts 12 and 13 are provided with plate-shaped outer-frame movable comb electrodes 12a and 13a, plate-shaped outer-frame driving comb electrodes 12b and 13b which oppose to the plate-shaped outer-frame movable comb electrodes 12a and 13a via minute spaces, and outer-frame fixed electrodes 12c and 13c for supporting the outer-frame driving comb electrodes 12b and 13b. Also, on the inside of the inner vibrating part 17, the detecting electrodes 14 and 15 are provided at the right side and the left side of the mass part 17c. The detecting electrode parts 14 and 15 are provided with plate-shaped frame movable comb electrodes 14a and 15a implemented in the quantity part 17c, plate-shaped inner-frame detecting comb electrodes 14b and 15b which oppose the plate-shaped frame movable comb electrode 14a and 15a via minute spaces, and inner fixed electrodes 14c and 15c for supporting the inner-frame detecting comb electrodes 14b and 15b.

Figure 7:
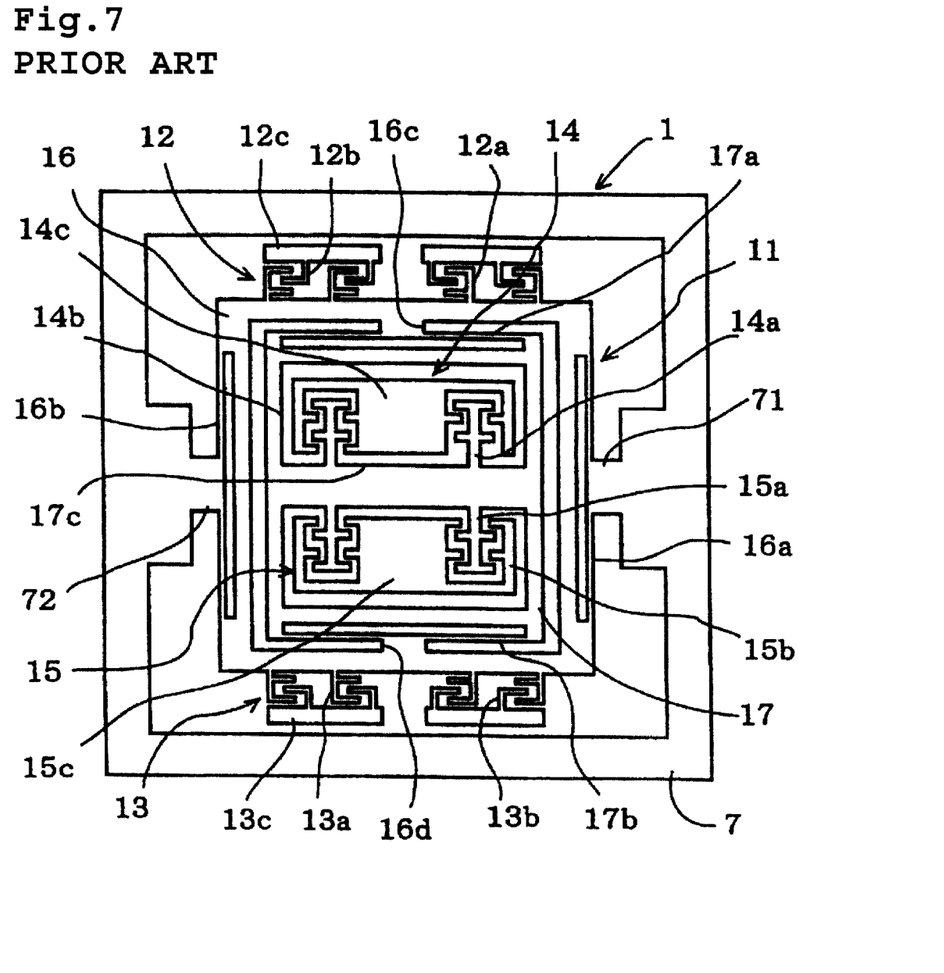
FIG. 7 is a plan view showing an example of a conventional angular velocity detecting element.

FIG. 7 does not show a support substrate and a cover substrate of the angular velocity detecting element 1, however, the support frame 7, the outer-frame fixed electrodes 12c and 13c and the inner-frame fixed electrodes 14c and 15c are fixed to the support substrate, and a space is provided between the support substrate and the cover substrate so that it is possible to vibrate the support parts 71 and 72, the entire vibrator 11 and all of the comb electrodes 12a to 15a. The cover substrate is in contact with the support frame 7 and covers the angular velocity detecting element 1. Also, the angular velocity detecting element 1 has a thickness in a direction orthogonal to the drawing, and particularly, the comb electrodes 12a to 15a maintain electrostatic capacitance since plate-shaped surfaces in the thickness direction oppose each other via minute spaces. Also, the outer-frame fixed electrodes 12c and 13c and the inner-frame fixed electrodes 14c and 15c are electrically connected to the outside of the support substrate via holes formed in the support substrate.

When the driving signal is applied to the outer-frame fixed electrodes 12c and 13c of the angular velocity detecting electrodes, an electrostatic force acts between the outer movable comb electrode 12a and 13a and the outer driving comb electrodes 12b and 13b, and vibrates the outer frame vibrating part 16 together with the inner vibrating part 17 as a driving force in the directions of the support parts 71 and 72 at a constant amplitude. In other words, the outer beams 16a and 16b flex and the entire vibrator 11 vibrates in the plane of the drawing. In this state, when the angular velocity detecting element 1 rotates around a center thereof as an axis, that is, when the angular velocity detecting element 1 rotates around an axis penetrating the center of the vibrator 11 orthogonal to the plane of the drawing, a Coriolis force in a direction perpendicular to the driving force acting direction is applied to the vibrator 11, and the inner-frame vibrating part 17 is displaced in a direction orthogonal to the inner beams 17a and 17b with flexion of the inner beams 17a and 17b. With this displacement vibration, the electrostatic capacitance between the inner movable comb electrodes 14a and 15a of the detecting electrodes 14 and 15 and the inner detecting comb electrodes 14b and 15b vary. The capacitance variations including this angular velocity signal component are extracted from the inner-frame fixed electrodes 14c and 15c, and are input into the gates 21a and 31a of the JFETs 21 and 31.

Figure 8:
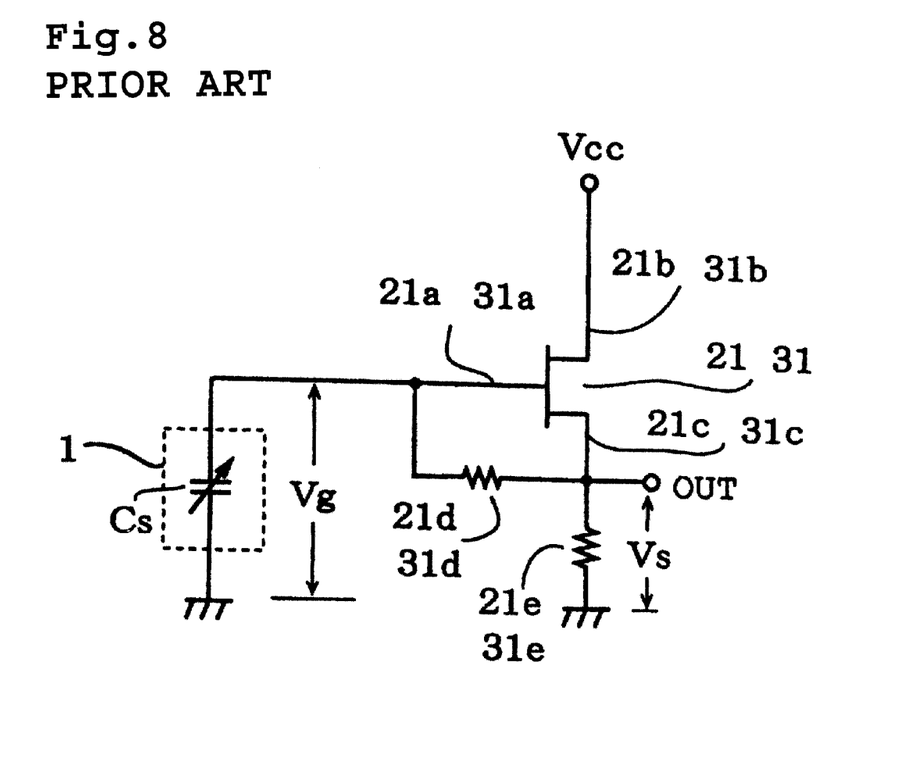
FIG. 8 is a circuit wiring diagram including a partial peripheral circuit of an angular velocity sensor according to the capacitance-voltage converting circuit in FIG. 6.

Now, the capacitance-voltage converting circuits 2 and 3 have the same circuit configuration using the JFETs 21 and 31. As shown in FIG. 8, when potentials between the gates 21a and 31a and the source 21c and 31c of the JFETs 21 and 31 are the same, a constant drain current flows from the drains 21b and 31b to the sources 21c and 31c. In addition, a capacitance Cs is the equivalent capacitance of the angular velocity detecting element 1.

Details of the operation of the capacitance-voltage converting circuits 2 and 3 are described with reference to FIG. 8. The gate resistors 21d and 31d of the JFETs 21 and 31 have an extremely high resistance of about 1 GΩ, therefore, hardly any current flows through the gate resistors 21d and 31d. Thus, when the equivalent capacitance Cs of the angular velocity detecting element does not vary, that is, when no Coriolis force is applied to the vibrator 11, the source potential, that is, the voltage Vs across both ends of the source resistors 21e and 31e is stable and constant and a gate voltage Vg becomes the same potential as the potential Vs across both ends of the source resistors 21e and 31e (Vg=Vs). When a Coriolis occurs in the vibrator 11 of the angular velocity detecting element 1, and the equivalent capacitance Cs of the angular velocity detecting element 1 varies, the gate potential varies and both ends of the source resistors 21e and 31e become output signals in which a signal voltage is superimposed on the direct current.

However, the conventional circuit block is provided with two capacitance-voltage converting circuits 2 and 3, that is, the JFETs 21 and 31. When the extraction of the vibration amplitude signal component by the non-inverting amplifier circuit 51 of the driving control circuit 5 and the extraction of the angular velocity signal component by the differential amplifier 61 of the output circuit 6 are taken into consideration, the amplitudes of the signal components of the output signals from the capacitance-voltage converting circuit 2 and the capacitance-voltage converting circuit 3 must be balanced. For example, at the center of the vibrator 11 shown in FIG. 6, when a clockwise rotation around a rotation axis orthogonal to the drawing is applied to the velocity detecting element 1, the capacitance of the detecting electrode part 15 at the right side, that is, the potential of the gate 31$d$ of the JFET 31, becomes positive for the gate voltage Vg, and the capacitance of the detecting electrode part 14 decreases and the potential of the gate 21$d$ of the JFET 21 becomes negative. Therefore, concerning the output of the JFET 21, the signal component is a negative voltage, and concerning the output of the JFET 31, the signal component is a positive voltage. The differential amplifier 61 of the output circuit 6 eliminates a noise component of the difference between the positive voltage signal and the negative voltage signal from the capacitance-voltage converting circuits 2 and 3 and then the angular velocity signal component is amplified.

Generally, the drain current of a JFET has a variation of about 50% for each JFET, therefore, though the electrostatic capacitance Cs of the detecting electrode parts 14 and 15 does not vary, the voltage across both ends of the source resistor 21$d$ of the JFET 21 is different from that of the source resistor 31$d$ of the JFET 31. As a result, the base potential of the JFET 21 is different from that of the JFET 31. The capacitance-voltage converting sensitivity, which is indicated by a variation $\Delta V$ of the gate potential against a variation $\Delta C$ of the electrostatic capacitance of the detecting electrode parts 14 and 15, is proportional to the gate voltage Vg, and is inversely proportional to the electrostatic capacitance of the detecting electrode parts 14 and 15 ($\Delta V/\Delta C=$ Vg/Cs); therefore, the variation of base potentials of the JFET 2 and the JFET 3 directly becomes the variation of capacitance-voltage sensitivities of the capacitance-voltage converting circuits 2 and 3. Thus, though variations of the electrostatic capacitance of the detecting electrode parts 14 and 15 are equal, an absolute value of the angular velocity signal component included in the output voltage of the capacity voltage converting circuits 2 and 3 is not equal. Therefore, though two outputs are differentially amplified by the differential amplifier 61, the angular velocity signal component includes a noise component and it is necessary to adjust the offset voltage component.

SUMMARY OF THE INVENTION

The object of the present invention is to provide an angular velocity sensor in which a capacitance-voltage converting sensitivity is made stable by setting a gate voltage of a JFET used in the capacitance-voltage converting circuit at a predetermined direct current potential.

An angular velocity sensor of the present invention includes a vibrator; support means for supporting the vibrator so as to be capable of vibrating; driving means for driving the vibrator by an electrostatic force; detecting means for detecting a displacement of the vibrator based on a Coriolis force applied to the vibrator as a variation of electrostatic capacitance; and a capacitance-voltage converting circuit for converting the variation of the electrostatic capacitance detected by the detecting means into a voltage variation, the capacitance-voltage converting circuit being structured and arranged as a source-follower circuit connected to a high-resistance gate resistor between a gate and a source using a JFET. As a feature, the gate of the JFET is connected to a bias power supply via a bias resistor.

The gate resistor connected between the gate and the source of the JFET has a high resistor value, for example, 1 G$\Omega$, and therefore, hardly any current flows between the gate and the source. Concerning the source-follower circuit, the source of the JFET is grounded via the source resistor, and an output signal from both ends of the source resistor to the detecting electrode part, the output signal which is a variation in the electrostatic capacitance converted into a voltage variation. A bias power supply Vs connecting a bias resistor is different from a direct-current power supply Vcc connecting the drain of the JFET and is a direct current power supply giving a potential lower than the Vcc but larger than a ground potential. For example, when Vcc is 5 V, 5>Vs>0 is determined. The bias resistor has a resistor value of $\frac{1}{100}$ to $\frac{1}{50}$ of the gate resistor, for example, 10 M$\Omega$ to 20 M$\Omega$. Also, the bias resistor may be a variable resistor and a gate potential can be adjust easily.

The gate potential Vg of the JFET is determined by dividing the potential of the bias power supply Vs with the gate resistor and the source resistor, and therefore, a predetermined direct current potential is fixed. For example, the direct current power supply Vcc is 5 V, the gate potential of thee JFET is determined in a range of 1.5 V to 3.5 V. In this case, a drain current corresponding to the potential determined as the gate potential flows. When a Coriolis force is applied to the vibrator, a voltage vibration corresponding to a variation of the electrostatic capacitance at the detecting electrode part appears while superimposing the gate potential Vg, and the voltage vibration becomes a voltage signal extracted from both ends of the source resistor, that is, an angular velocity signal component. By determining a predetermined gate potential Vg for each JFET, it is possible to make capacitance-voltage converting sensitivities different in respective JFETs equal.

Also, the driving means includes two driving electrode parts vibrating the vibrator by driving signals the phases of which differ by 180 degrees, the detecting means includes two detecting electrode parts detecting electrostatic capacitance the phases of which differs by 180 degrees in accordance with the vibration in the vibrator, and it is possible to adjust capacitance-voltage converting sensitivities of two JFETs by adjusting bias resistors of the respective capacitance-voltage converting circuits connected to the respective detecting electrode parts.

With this configuration, an electrostatic force driving the vibrator becomes doubled. Also, two signals from two detecting electrode parts are converted into voltage signals by the respective capacitance-voltage converting circuits and these two voltage signals are differentially amplified, and thereby an angular velocity signal including no vibration amplitude signal component can be obtained. In this case, the resistance of bias resistors in the two capacitance-voltage converting circuits are individually determined and capacitance-voltage converting sensitivities of two JFETs are made equal by setting gate voltages Vg of two JFETs and, therefore, absolute values of output voltages of angular velocity signal components included in two capacity voltage converting circuits are equal.

The driving means for vibrating the vibrator is a self-excitation oscillating circuit or separate-excitation oscillating circuit and uses a vibration amplitude signal component as a feedback signal. The driving means is provided with a monitor electrode part for detecting, an amplitude of vibration of the vibrator and a second capacitance-voltage converting circuit for converting a variation in the electrostatic capacitance in the monitor electrode part into a voltage variation, and the capacitance-voltage converting circuit can be made as a source-follower circuit in which a high resistor is connected between the gate and the source using a JFET and the gate of the JFET can be connected to a bias power supply via a bias resistor.

According to the present invention, the monitor electrode part detects a vibration state of the vibrator is directly detected as a variation of the electrostatic capacitance. The variation of the electrostatic capacitance is converted into a voltage signal by a JFET of a capacitance-voltage converting circuit as a monitor signal; however, a capacitance-voltage converting sensitivity is stable similarly to a case of the detecting electrode part in this capacitance-voltage conversion, and therefore, it becomes easy to adjust driving control circuits different for each angular velocity sensor. The stable voltage signal includes the vibration amplitude signal component representing an amplitude, a phase and a frequency of the vibration, and therefore, it becomes a feedback signal for maintaining oscillation when the driving means is self-excitation oscillated and it becomes a signal stowing a phase when separate excitation oscillating.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Hereinafter, the preferred embodiments of the present invention are explained in detail with reference to the drawings.

The present invention will be further illustrated with examples below. In addition, the same numerals are applied to the same parts as are in FIG. 6 and FIG. 7 and, accordingly, explanations thereof will be omitted.

Figure 1:
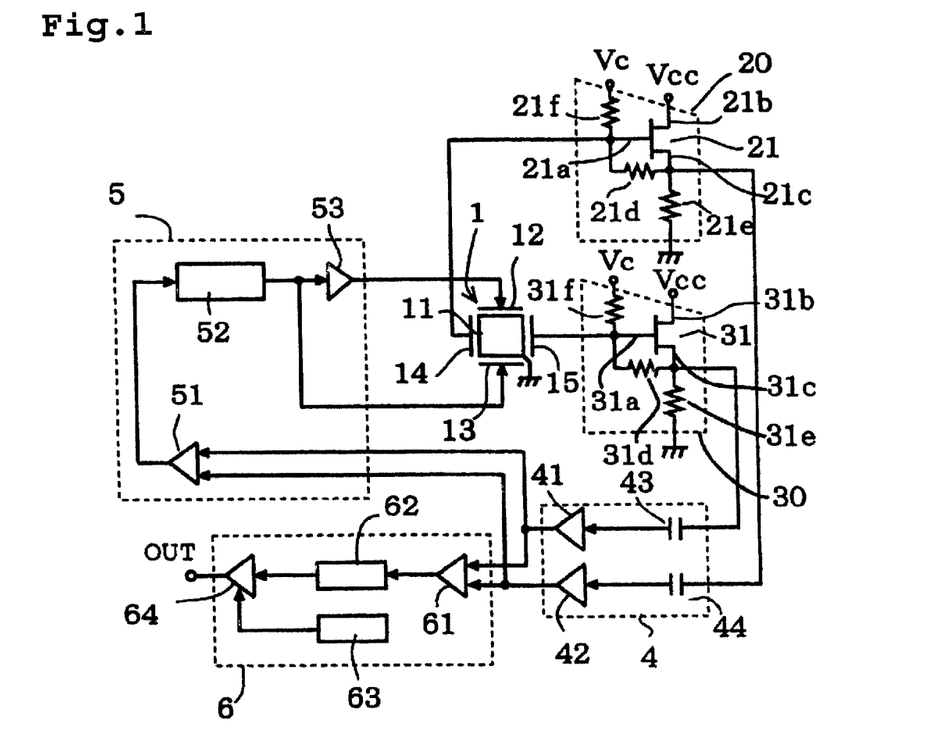
FIG. 1 is a circuit block diagram of an angular velocity sensor according to the present invention.
Figure 2:
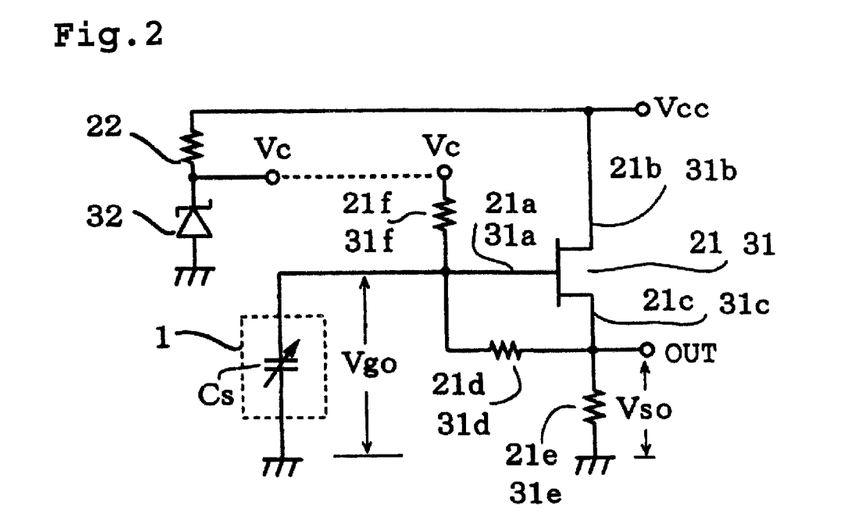
FIG. 2 is a circuit wiring diagram including a partial peripheral circuit of the capacitance-voltage converting circuit shown in FIG. 1.

In FIG. 1, a capacitance-voltage converting circuit 20 and a capacitance-voltage converting circuit 30 have a similar circuit configuration and are connected between detecting electrode parts 14 and 15 and an alternating-current amplifier 4. FIG. 2 shows a configuration of the capacitance-voltage converting circuits 20 and 30 including peripheral circuits, that is, a source follower circuit using a JFET. Gates 21a and 31a of JFETs 21 and 31 are grounded via an equivalent capacitance Cs representing the detecting electrode parts 14 and 15 of an angular velocity detecting element 1. Also, the gates 21a and 31a are connected to a common power supply Vc, for example, a power supply of 2.5 V, via bias resistors 21f and 31f, for example, a resistor of 20 MΩ. Further, the gates 21a and 31a are connected to sources 21c and 31c via gate resistors 21d and 31d, for example, a resistor of 1 GΩ.

As noted above, the capacitance-voltage converting circuit 20 is made as a source-follower circuit using a JFET 21, 31. Because the gate resistor 21d, 31d is of a high resistance and the gate is connected to a bias power supply Vc via the bias resistor 21f, 31f, regardless of variations in drain currents of JFET, the resistances of the bias resistor and the gate resistor are set for each JFET; thereby, it is possible to make the capacitance-voltage converting sensitivities of the capacity voltage converting circuit equal. Therefore, there is no variation in angular sensitivities and offset voltages in the angular velocity sensor.

The bias resistors 21f, 31f of the capacitance-voltage converting circuits are adjusted so that the capacitance-voltage converting sensitivities are made equal, and therefore, it is possible to make the amplitudes of the angular velocity signal component at an output of two capacitance-voltage converting circuits equal. Therefore, symmetrical input signals result when two angular velocity signal components are differentially amplified by a differential amplifier and a satisfactory angular velocity signal including no offset voltage can be obtained. As a result, for example, the output in a case in which a clockwise rotation is applied to the angular velocity detecting element and the output in a case in which a counterclockwise rotation is applied to the angular velocity detecting element are balanced, and therefore, it becomes easy to use an angular velocity signal.

The operation of the circuit in FIG. 2 will be explained. Gates 21a and 31a of the JFETs 21 and 31 and both ends of the equivalent capacitance Cs of the detecting electrode parts 14 and 15 become a D.C. potential Vgo which is divided from the common voltage Vc by the bias resistors 21f and 31f and the gate resistors 21d and 31f and source resistors 21e and 31e. In this case, a resistance Rs of the source resistors 21e and 31e is much smaller than a resistance Rb of the bias resistors 21f and 31f and a resistance Rg of the gate resistors 21d and 31f; therefore, it is possible to ignore the resistance Rs, and the gate potential Vgo is approximately given by Vgo=Rg·Vc/(Rb+Rg). When the D.C. voltage Vgo is applied to the gates 21a and 31a of the JFETs 21 and 31, the gate potential of the gates 21a and 31a becomes stable and the potential across both ends of the equivalent capacitance Cs becomes stable at a same time. The gate potential of the gate 21a of the JFET 21 and the gate potential of the gate 31a of the JFET 31 are set to the same potential regardless of the variation of drain currents of the JFET 21 and the JFET 31, and thereby it is possible to make capacitance-voltage converting sensitivities of the JFETs 21 and 31 equal. In this case, since the drain currents of the JFETs 21 and 31 become a current corresponding to a D.C. potential Vgo, D.C. voltages Vgo at both ends of the source resistors 21e and 31e are different; however, they are prevented by the direct-current blocking capacitors 43 and 44 of the alternating-current amplifier 4, and therefore, there is no effect on the circuit operation.

Figure 3:
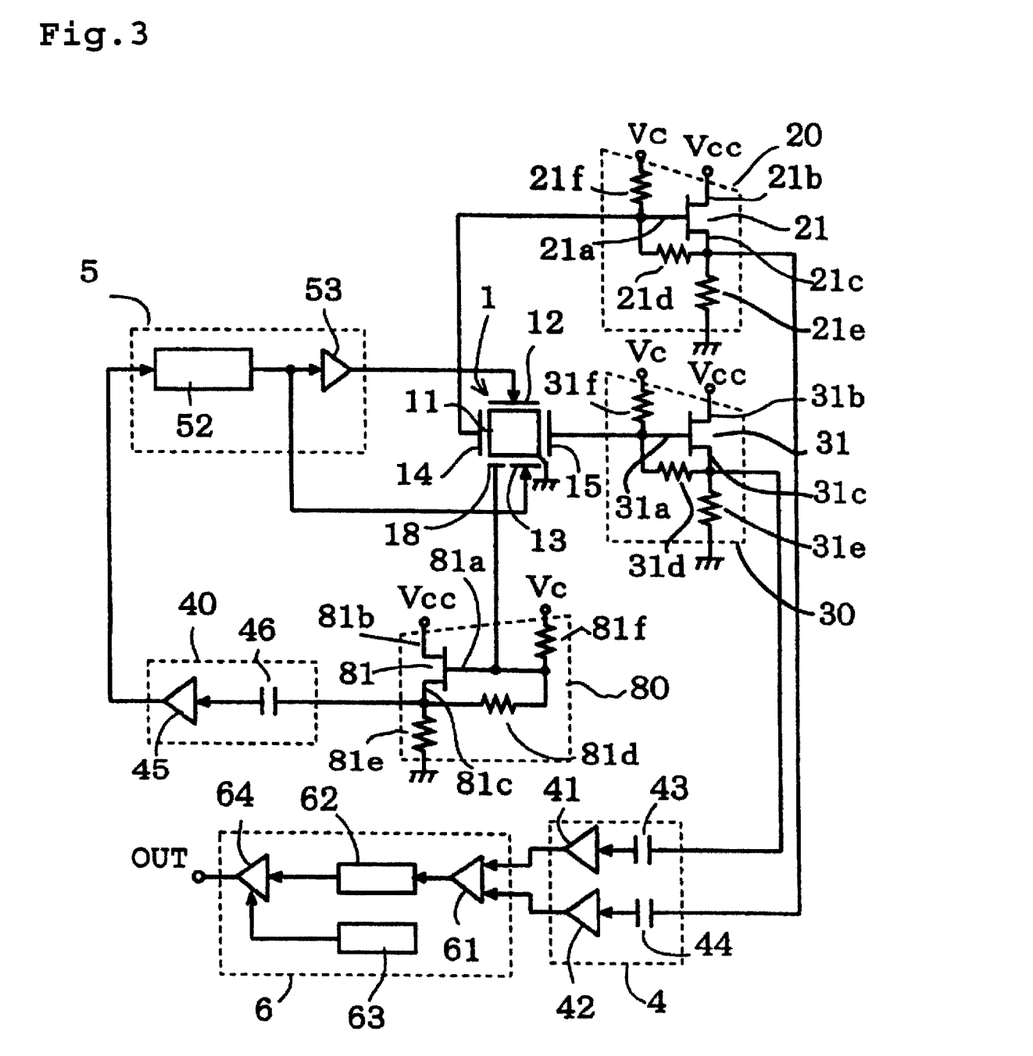
FIG. 3 is a circuit block diagram showing an angular velocity sensor according to another embodiment of the present invention.

FIG. 3 is a circuit block diagram showing another embodiment of the present invention. The same numerals are applied to the same parts as are in FIG. 1, FIG. 6, and FIG. 7, and explanations thereof will be omitted. The circuit block diagram shown in FIG. 3 shows an example in which self-excitation oscillation is carried out by obtaining a monitor output from the angular velocity detecting element 1. In FIG. 3, a monitor electrode part 18 is newly provided at a side of the driving electrode part 13 in the angular velocity detecting element 1 and detects a vibration state of the vibrator 11 electrostatically. The monitor electrode part 18 is connected to a gate 81a of a JFET 81 in a capacitance-voltage converting circuit 80. The gate 81a of the JFET 81 is connected to the common power supply via a bias resistor 81f and is connected to a source 81c via a gate resistor 81d. A drain 81b of the JFET 81 is connected to a D.C. power supply Vcc and a source 81c of the JFET 81 is grounded via the source resistor 81d and converts a variation in the electrostatic capacitance in the monitor electrode part 18 due to vibration of the vibrator 11 into a voltage variation. The output of the capacitance-voltage converting circuit 80, that is, the source 81c of the JFET 81 is connected to an input of an alternating-current amplifying circuit 40. The alternating-current amplifying circuit 40 is provided with a direct-current blocking capacitor 46 and an amplifier 45 and amplifies a varying amplitude signal except for a direct current in the amplifier 45.

With this configuration, when the vibrator 11 vibrates, an electrostatic capacitance varying at the vibration frequency of the vibrator 11 appears and the variation of the electrostatic capacitance is converted into a voltage signal by a source follower circuit which is the JFET 81. The voltage signal includes only the vibration frequency component of the vibrator 11. The voltage signal converted by the capacitance-voltage converting circuit 80 is input into the alternating current amplifying circuit 40 from the source 81c of the JFET 81. The vibration amplitude signal component amplified by the amplifier 45 is fed back to the driving circuit 5 and then self-oscillating driving of the angular velocity detecting element 1 is maintained.

The monitor means detects a monitor signal corresponding to a vibration amplitude of the vibrator, and therefore, it is possible to make a self-excitation oscillating circuit for maintaining the excitation of the vibration using the monitor signal. Also, in the case of a driving control circuit using separate excitation, the monitor signal can be used as a control signal for the amplitude and the phase of the driving signal.

Further, the capacitance-voltage converting circuit 80 is made as a source-follower circuit connected to a gate resistor of a high resistance between a gate 81a and a source 81c using a JFET 81, the gate 81a being connected to a bias power supply via a bias resistor 81f and a gate potential is fixed to a predetermined potential; therefore, when a variation in an electrostatic capacitance detected by the monitor means is converted into a voltage variation, regardless of variation of drain currents of the JFET in each angular velocity sensor, it is possible to make capacity voltage converting sensitivities stable and it is possible to reduce variations of angular velocity sensors in mass production. The drains 21b and 31b of the JFETs 21 and 31 are connected to a direct current power supply Vcc, for example, a power supply of 5 V. The sources 21c and 31c of the JFETs 21 and 31 are grounded via source resistors 21e and 31e. Also, the sources 21c and 31c are output ends of the capacitance-voltage converting circuits 2 and 3 and supply voltages across both ends of source resistors 21e and 31e to the alternating-current amplifier 4. The common power supply Vc is made by connecting a series circuit of a resistor 22 and a zener diode 32 to both ends of the direct current power supply Vcc, and a stable voltage across both ends of the zener diode 32 is set as a common voltage. When the voltage of the direct current power supply Vcc is stable, a resistor may be used instead of the zener diode 32. Usually, a common potential is obtained from a common power supply line provided on a circuit substrate.

Figure 4:
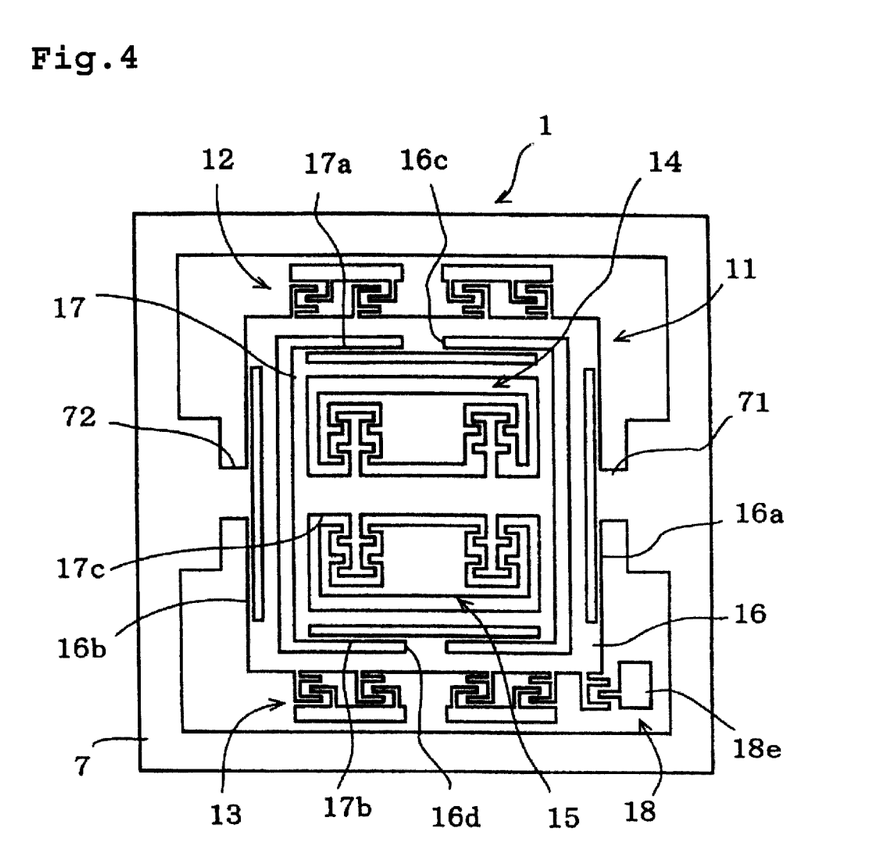
FIG. 4 is a plan view showing an example of an angular velocity detecting element used in the angular velocity sensor according to the present invention.

FIG. 4 shows an example of the angular velocity detecting element 1. This example is different from FIG. 6 in that the monitor electrode part 18 is provided. The monitor electrode part 18 is arranged at the outer-frame vibrating part 16 adjacent to the driving electrode part 13. The monitor electrode part 18, shown enlarged in FIG. 5, is provided with plate-shaped monitor movable comb electrodes 18b and 18c connected to the outer frame vibrating part 16 with a plate-shaped connecting electrode 18a, there being a plate-shaped monitor fixed comb electrode 18d between the monitor movable comb electrodes 18b and 18c, opposing the monitor movable comb electrodes 18b and 18c via a minute space, and a monitor fixed electrode 18e supporting the monitor fixed comb electrode 18d.

Figure 5:
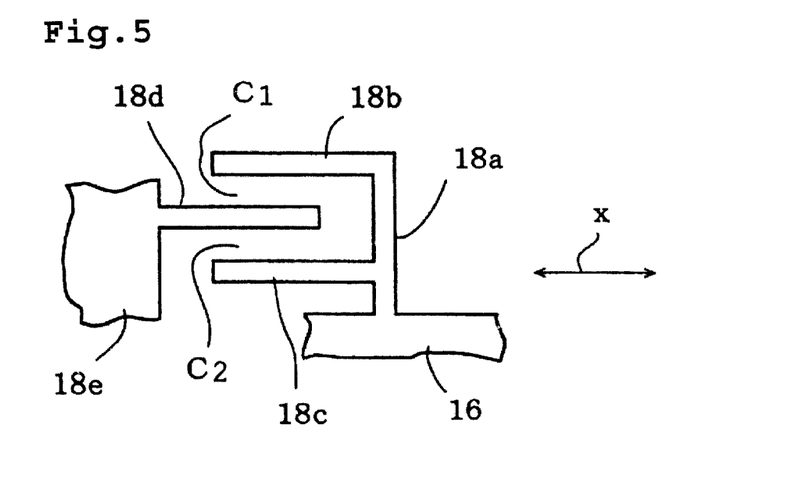
FIG. 5 is an enlarged plan view showing a monitor electrode part in FIG. 4.

When the vibrator 11 of the angular velocity detecting element 1 vibrates in the direction of the arrow x in FIG. 5, that is, in the horizontal direction in FIG. 5, a capacitance variation due to the vibration frequency of the vibrator appears in the monitor fixed electrode 18e. At this time, the Coriolis force is applied to the vibrator 11, and an inner-frame vibrating part 17 is displaced in the direction perpendicular to the arrow x; however, the outer- frame vibrating part 16 is not displaced in a direction perpendicular to the arrow x since the outer beams 16a and 16b do not flex. Also, when it is assumed that the electrostatic capacitance between the monitor fixed electrode 18d and the monitor movable electrodes 18b and 18c are set to C1 and C2, these are connected in parallel and, therefore, the total electrostatic capacitance (C1+C2) does not vary though the outer vibrating part 16 is displaced in a direction perpendicular to the arrow x. Therefore, though an angular velocity is applied to the angular velocity detecting element 1, the capacitance variation generated in the monitor fixed electrode 18d includes no angular velocity signal component.

In the circuit block diagrams in FIG. 1 and FIG. 3, explanations are given of a case in which the angular velocity detecting element 1 is driven by self-oscillating; however, an oscillating circuit may be provided in the driving circuit 5 and separate excitation driving may be used. In this case, the vibration amplitude signal component is used as a control signal fixing the phase and the amplitude of a driving signal.

As explained above, according to the present invention, a capacitance-voltage converting circuit is made as a source-follower circuit using a JFET, a gate resistor of a high resistance is connected between a gate and a source of the JFET and the gate is connected to a bias power supply via a bias resistor, and therefore, regardless of variations in drain currents of JFET, the resistances of a bias resistor and a gate resistor are set for each JFET, and thereby, it is possible to make the capacitance-voltage converting sensitivities of the capacity voltage converting circuit equal. Therefore, there is no variation in angular sensitivities and offset voltages in the angular velocity sensor.

Moreover, bias resistors of capacitance-voltage converting circuits connected to two detecting electrode parts are adjusted so that the capacitance-voltage converting sensitivities are made equal, and therefore, it is possible to make the amplitudes of the angular velocity signal component at an output of two capacitance-voltage converting circuits equal. Therefore, symmetry input signals becomes sufficient when two angular velocity signal components are differentially amplified by a differential amplifier and a satisfactory angular velocity signal including no offset voltage can be obtained. As a result, for example, the output in a case in which a clockwise rotation is applied to the angular velocity detecting element and the output in a case in which a counterclockwise rotation is applied to the angular velocity detecting element are balanced, and therefore, it becomes easy to use an angular velocity signal.

In addition, the monitor means detects a monitor signal corresponding to a vibration amplitude of the vibrator, and therefore, it is possible to make a self-excitation oscillating circuit for maintaining the excitation of the vibration using the monitor signal. Also, in the case of a driving control circuit using separate excitation, the monitor signal can be used as a control signal for the amplitude and the phase of the driving signal.

Further, a capacitance-voltage converting circuit is made as a source-follower circuit connected to a gate resistor of a high resistance between a gate and a source using a JFET, the gate is connected to a bias power supply via a bias resistor and a gate potential is fixed to a predetermined potential; therefore, when a variation in an electrostatic capacitance detected by the monitor means is converted into a voltage variation, regardless of variation of drain currents of the JFET in each angular velocity sensor, it is possible to make capacity voltage converting sensitivities stable and it is possible to reduce variations of angular velocity sensors in mass production.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor comprising:
    a vibrator;
    support means for supporting the vibrator so as to be capable of vibrating;
    driving means for driving the vibrator by an electrostatic force;
    detecting means for detecting a displacement of the vibrator based on a Coriolis force applied to the vibrator as a variation of electrostatic capacitance; and
    capacitance-voltage converting means for converting the variation of the electrostatic capacitance detected by the detecting means into a voltage variation, the capacitance-voltage converting means including a source-follower circuit connected to a high-resistance gate resistor between a gate and a source of a JFET, the gate of the JFET being connected to a bias power supply via a bias resistor.

2. An angular velocity sensor according to claim 1, further comprising a monitor electrode for detecting an amplitude of the vibration of the vibrator.

3. An angular velocity sensor according to claim 2, further comprising:
    a capacitance-voltage converting circuit for converting a variation of electrostatic capacitance in the monitor electrode into a voltage variation, the capacitance-voltage converting circuit being structured and arranged as a source-follower circuit in which a high resistance is connected between a gate and a source of a JFET, the gate of the JFET being connected to a bias power supply via bias resistor.

4. An angular velocity sensor comprising:
    a vibrator;
    a support for supporting the vibrator so as to be capable of vibrating;
    at least one driving electrode for driving the vibrator by an electrostatic force;
    at least one detecting electrode for detecting a displacement of the vibrator based on a Coriolis force applied to the vibrator as a variation of electrostatic capacitance; and
    at least one capacitance-voltage converting circuit for converting the variation of the electrostatic capacitance detected by the detecting electrode into a voltage variation, the capacitance-voltage converting circuit being structured and arranged as a source-follower circuit connected to a high-resistance gate resistor between a gate and a source using a JFET, the gate of the JFET being connected to a bias power supply via a bias resistor.

5. An angular velocity sensor according to claim 4, further comprising:
    a monitor electrode for detecting an amplitude of the vibration of the vibrator.

6. An angular velocity sensor according to claim 5, further comprising:
    a second capacitance-voltage converting circuit for converting a variation of electrostatic capacitance in the monitor electrode into a voltage variation, the second capacitance-voltage converting circuit being structured and arranged as a source-follower circuit in which a high resistance is connected between a gate and a source of a JFET, the gate of the JFET being connected to a bias power supply via bias resistor.

7. An angular velocity sensor comprising:
    a vibrator;
    a support for supporting the vibrator so as to be capable of vibrating;
    a pair of driving electrodes for driving the vibrator by an electrostatic force;
    a pair of detecting electrodes for detecting a displacement of the vibrator based on a Coriolis force applied to the vibrator as a variation of electrostatic capacitance; and
    first and second capacitance-voltage converting circuits connected respectively to the detecting electrodes for converting the variation of the electrostatic capacitance detected by each detecting electrode into a voltage variation, each of the capacitance-voltage converting circuits being structured and arranged as a source-follower circuit connected to a high-resistance gate resistor between a gate and a source using a JFET, the gate of the JFET being connected to a bias power supply via a bias resistor.

8. An angular velocity sensor according to claim 7, wherein the pair of driving electrodes are structured and arranged for vibrating the vibrator in a predetermined direction with signals, the phases of which differ by 180 degrees, the pair of detecting electrodes are structured and arranged for detecting variations of electrostatic capacitance the phases of which differ by 180 degrees, and capacitance-voltage converting sensitivities of the JFETs of each capacitance-voltage converting circuit are adjusted by adjusting the respective bias resistor.

9. An angular velocity sensor according to either claim 7 or claim 8, further comprising:
    a monitor electrode for detecting an amplitude of the vibration of the vibrator.

10. An angular velocity sensor according to claim 9, further comprising:
    a third capacitance-voltage converting circuit for converting a variation of electrostatic capacitance in the monitor electrode into a voltage variation, the third capacitance-voltage converting circuit being structured and arranged as a source-follower circuit in which a high resistance is connected between a gate and a source of a JFET and the gate of the JFET is connected to a bias power supply via a bias resistor.

* * * * *